US012352099B2

(12) United States Patent
Conklin et al.

(10) Patent No.: US 12,352,099 B2
(45) Date of Patent: Jul. 8, 2025

(54) ELECTRICAL SPACER BAR TRANSFER DEVICE FOR ELECTRICITY-GENERATING SURFACE

(71) Applicant: SolarWindow Technologies, Inc., Scottsdale, AZ (US)

(72) Inventors: John A. Conklin, Apalachin, NY (US); Patrick T. Sargent, Canton, GA (US)

(73) Assignee: SolarWindow Technologies, Inc., Scottsdale, AZ (US)

( * ) Notice: Subject to any disclaimer, the term of this patent is extended or adjusted under 35 U.S.C. 154(b) by 60 days.

(21) Appl. No.: 17/650,461

(22) Filed: Feb. 9, 2022

(65) Prior Publication Data

US 2022/0290490 A1 Sep. 15, 2022

Related U.S. Application Data

(63) Continuation of application No. 16/855,715, filed on Apr. 22, 2020, now Pat. No. 11,274,488.

(60) Provisional application No. 62/837,103, filed on Apr. 22, 2019.

(51) Int. Cl.
*E06B 3/663* (2006.01)
*E06B 3/667* (2006.01)

(52) U.S. Cl.
CPC .............. *E06B 3/663* (2013.01); *E06B 3/667* (2013.01)

(58) Field of Classification Search
CPC ............. E06B 2009/2476; E06B 3/663; E06B 3/667
See application file for complete search history.

(56) References Cited

U.S. PATENT DOCUMENTS

| | | | | |
|---|---|---|---|---|
| 6,567,708 | B1 | 5/2003 | Bechtel et al. | |
| 9,222,298 | B2 * | 12/2015 | Mueller | H01L 31/02008 |
| 9,436,054 | B2 * | 9/2016 | Brown | E06B 3/6722 |
| 9,728,920 | B2 * | 8/2017 | Brown | H01R 25/162 |
| 11,274,488 | B2 * | 3/2022 | Conklin | E06B 3/66314 |
| 2003/0191546 | A1 | 10/2003 | Bechtel et al. | |
| 2008/0088787 | A1 | 4/2008 | Yim et al. | |
| 2011/0023391 | A1 | 2/2011 | Clair et al. | |
| 2012/0194895 | A1 | 8/2012 | Podbelski et al. | |
| 2014/0000191 | A1 | 1/2014 | Snyker et al. | |
| 2014/0099826 | A1 | 4/2014 | Mueller et al. | |
| 2016/0222718 | A1 | 8/2016 | Nieminen et al. | |
| 2017/0219908 | A1 * | 8/2017 | Brown | H01R 4/12 |

(Continued)

FOREIGN PATENT DOCUMENTS

| | | |
|---|---|---|
| CN | 103608719 | 2/2014 |
| CN | 114207242 | 3/2022 |
| EP | 1529922 | 5/2005 |

(Continued)

OTHER PUBLICATIONS

"International Application Serial No. PCT US2020 029342, International Search Report mailed Aug. 12, 2020", 8 pgs.

(Continued)

*Primary Examiner* — Andrew J Triggs
(74) *Attorney, Agent, or Firm* — Miller Johnson

(57) ABSTRACT

A system including an electrical spacer bar transfer device (E-SBTD) and an electrical spacer bar receiving device (E-SBRD), wherein the electrical spacer bar transfer device (E-SBTD) is configured to be electrically connected to the electrical spacer bar receiving device (E-SBRD).

20 Claims, 9 Drawing Sheets

FRONT VIEW

BOTTOM VIEW

(56) References Cited

U.S. PATENT DOCUMENTS

| | | | | |
|---|---|---|---|---|
| 2021/0011322 | A1 | 1/2021 | Conklin et al. | |
| 2022/0290490 | A1* | 9/2022 | Conklin | E06B 3/66314 |

FOREIGN PATENT DOCUMENTS

| | | | | |
|---|---|---|---|---|
| GB | 2292581 | | 7/1996 | |
| WO | 2013038409 | | 3/2013 | |
| WO | WO-2013038409 | A2 * | 3/2013 | E06B 3/667 |
| WO | 2015120063 | | 8/2015 | |
| WO | 2020219561 | | 10/2020 | |

OTHER PUBLICATIONS

"International Application Serial No. PCT US2020 029342, Written Opinion mailed Aug. 12, 2020", 6 pgs.
"U.S. Appl. No. 16/855,715, Non Final Office Action mailed Apr. 16, 2021", 13 pgs.
"U.S. Appl. No. 16/855,715, Response filed Sep. 16, 2021 to Non Final Office Action mailed Apr. 16, 2021", 7 pgs.
"U.S. Appl. No. 16/855,715, Notice of Allowance mailed Nov. 4, 2021", 7 pgs.
"International Application Serial No. PCT US2020 029342, International Preliminary Report on Patentability mailed Nov. 4, 2021", 8 pgs.
"Mexican Application Serial No. MX a 2021 012990, Office Action mailed Nov. 25, 2021", With English machine translation, 17 pgs.
"U.S. Appl. No. 16/855,715, Supplemental Notice of Allowability mailed Dec. 24, 2021", 2 pgs.
"Mexican Application Serial No. MX a 2021 012990, Response filed Mar. 15, 2022 to Office Action mailed Nov. 25, 2021", With English machine translation, Claims not amended in response filed, 81 pgs.
"European Application Serial No. 20794384.6, Response to Communication pursuant to Rules 161 and 162 filed Jun. 9, 2022", 12 pgs.
"European Application Serial No. 20794384.6, Extended European Search Report mailed Nov. 15, 2022", 8 pgs.
"Chinese Application Serial No. 202080037984.4, Office Action mailed Apr. 4, 2023", w English Translation, 19 pgs.

* cited by examiner

FRONT VIEW

BOTTOM VIEW

SIDE VIEW 200
202
208
204
207
204
203
208
206

FRONT VIEW
200
202
210
210
206
206

BOTTOM VIEW
200
202
204
206
210

SIDE VIEW

ELECTRICAL SPACER BAR TRANSFER DEVICE FOR ELECTRICITY-GENERATING SURFACE

CROSS-REFERENCE TO RELATED APPLICATIONS

This application is a continuation of U.S. application Ser. No. 16/855,715, filed on Apr. 22, 2020, which claims the benefit of U.S. Provisional Application No. 62/837,103, filed on Apr. 22, 2019. The entire contents of U.S. Provisional Application No. 62/837,103 are hereby incorporated by reference.

BACKGROUND

A conventional electrical wiring connection system may include a wiring system and components (electrical energy hardware, wire and terminal contacts, connections, etc.) to transfer electrical energy from a device (such as an electricity-generating glass or flexible substrate product(s) (EGPs)) to wires for use. These connections commonly must rely on electrical wiring connections, adding connectors, and installation of junction boxes at discrete points of contact or connection, and electrical testing.

SUMMARY OF THE INVENTION

The present invention recognizes that the discrete points of contact or connection in conventional electrical wiring connection systems present challenges for the installation of devices EGPs that have limited or constrained access by space or hardness of adjoining materials of construction (i.e., a masonry unit construction, steel, etc.).

Often during installation, the integrity of a mounting fixture of such devices may be compromised by drilling or cutting access points into the adjoining materials to accommodate the conventional electrical wiring connection system causing electrical and framing unit failure.

In the convention art, the installation of an electrical energy device may be compromised or prohibited by difficult, if not impossible, installations due to space, fixture, building and framing unit constraints that do not allow proper electrical connection.

Further, conventional devices, such as various types of EGPs, commonly may be bound by rigid extrusions, whereby the installation of electrical components in such devices may require a penetration of the extrusion, which in turn, may compromise the integrity and insulating value of the framing system, thus prohibiting electrical connection to conductors required by an electricity-generating device.

The present invention recognizes that there is a need for this art in the industry for replacing conventional discrete point electrical wiring connections with an improved and simplified next-generation system for collecting the power produced by EGPs. To solve these and other related electrical connection problems, the present invention provides a novel Inter- and Inner Connection Spacer Bar Transfer and Receiving Device that reduces costs and improves ease of electrical installation, thereby providing important advantages for glass and window fabricators; and glass installers (i.e., glaziers), electricians, and maintenance personnel.

The present invention further provides a novel Inter- and Inner Connection Spacer Bar Transfer and Receiving Device (E-SBTD) that allows EGPs to maintain integrity, function, and purpose of an insulated glass, laminated veneer, spandrel, etc., and all other glass fabricated products, to function as designed and fabricated while allowing effective electron or electricity transfer from the electricity-generating surface(s) of the EGP to the elements of the E-SBTD. The exemplary embodiments of the invention allow for maximum electricity generation and inter- and inner-connection from EGPs, while at the same time maintaining all of the performance properties regarding heat gain and insulating properties, and internal atmospheres and aesthetic value.

The present invention further recognizes that the combining of EGPs and the E-SBTD will allow productive and efficient electricity transfer for use. According to example embodiments of the invention, an E-SBTD can be configured as an integral part of any EGP. It is necessary in allowing needed electron transfer from the electrical coating on the inside of the EGP to the external frame mounted wiring harness. The E-SBTD can be configured to fit into or on the existing form factor used in any EGP device to promote safe, and efficient and effective transfer of electrons (electricity) from the EGP edge to wiring harness mounted in or on the frame, or along the edge surface.

In an exemplary embodiment, the present invention provides a system comprising an E-SBTD, and an electrical spacer bar receiving device (E-SBRD), wherein the E-SBTD is configured to electrically connect to the E-SBRD.

The present invention is not limited to any particular EGP and can include, for example, various insulated glass (IG), laminated veneer, spandrel, creative glass, textured glass, security glass, etc., among other glass products.

An exemplary embodiment of the invention can include, for example, a system including an electrical spacer bar transfer device (E-SBTD) and an electrical spacer bar receiving device (E-SBRD), wherein the electrical spacer bar transfer device (E-SBTD) is configured to be electrically connected to the electrical spacer bar receiving device (E-SBRD).

The electrical spacer bar transfer device (E-SBTD) may be integrated into a glass product, such as into a spacer bar of a sealed edge of a glass product. The electrical spacer bar transfer device (E-SBTD) can include engagement devices at opposite ends configured to friction fit or press fit the spacer bar of the glass product to secure the electrical spacer bar transfer device (E-SBTD) to the spacer bar of the glass product.

In some examples, the electrical spacer bar transfer device (E-SBTD) can include a plurality of first electrical contacts and the electrical spacer bar receiving device (E-SBRD) can include a plurality of second electrical contacts configured to be electrically connected to the plurality of first electrical contacts. At least one of each of the plurality of first electrical contacts and the plurality of second electrical contacts includes a corresponding shape that permits electrical connection of the plurality of first electrical contacts to the plurality of second electrical contacts in only one way.

In some examples, at least one of the electrical spacer bar transfer device (E-SBTD) and the electrical spacer bar receiving device (E-SBRD) can include a seal (e.g., a silicone seal) configured to seal the plurality of first and second electrical contacts from an external environment when the plurality of first and second electrical contacts are electrically connected.

The electrical spacer bar receiving device (E-SBRD) can be integrated into a frame configured to receive the glass product. In some examples, the electrical spacer bar receiving device (E-SBRD) can include at least one tension bar configured to secure the electrical spacer bar receiving device (E-SBRD) to the frame configured to receive the glass product. The at least one tension bar can be configured to be inserted into an opening in the frame and rotatable into a position under a portion of the frame. The at least one tension bar can be configured to be elastically deformable to press against the portion of the frame and secure the electrical spacer bar receiving device (E-SBRD) to the frame. The at least one tension bar can be configured to be actuated by an actuator to at least one of draw, press, and tighten the at least one tension bar against the portion of the frame and secure the electrical spacer bar receiving device (E-SBRD) to the frame. The actuator can be a screw or the like. In some examples, at least a portion of a body of the electrical spacer bar receiving device (E-SBRD) can be configured to be inserted into an opening in the frame configured to receive the glass product.

In some examples, the system can include at least one sealing device between a body of the electrical spacer bar receiving device (E-SBRD) and the frame. The sealing device can be configured to provide a watertight seal between the electrical spacer bar receiving device (E-SBRD) and the frame. At least a portion of the at least one sealing device can be configured to be inserted into an opening in the frame configured to receive the glass product. In other examples, the sealing device can include a perimeter portion that interposes body of the electrical spacer bar receiving device (E-SBRD) and the frame to provide the watertight seal, and a cup portion configured to be inserted into the opening in the frame.

In some examples, the electrical spacer bar receiving device (E-SBRD) can be configured to be mounted and secured to a surface of the frame configured to receive the glass product. In other examples, the frame can include a countersunk support portion, wherein at least a portion of a body of the electrical spacer bar receiving device (E-SBRD) is disposed within the countersunk support portion. The system can include at least one sealing device between the body of the electrical spacer bar receiving device (E-SBRD) and the frame, the at least one sealing device configured to provide a watertight seal between the electrical spacer bar receiving device (E-SBRD) and the frame. At least a portion of the at least one sealing device can be configured to be inserted into the countersunk support portion of the frame. In some examples, the sealing device can include a perimeter portion that interposes the body of the electrical spacer bar receiving device (E-SBRD) and a portion of the frame surrounding the countersunk support portion. At least one fastener can be configured to couple the electrical spacer bar receiving device (E-SBRD) to the countersunk support portion of the frame.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

Figure 1:
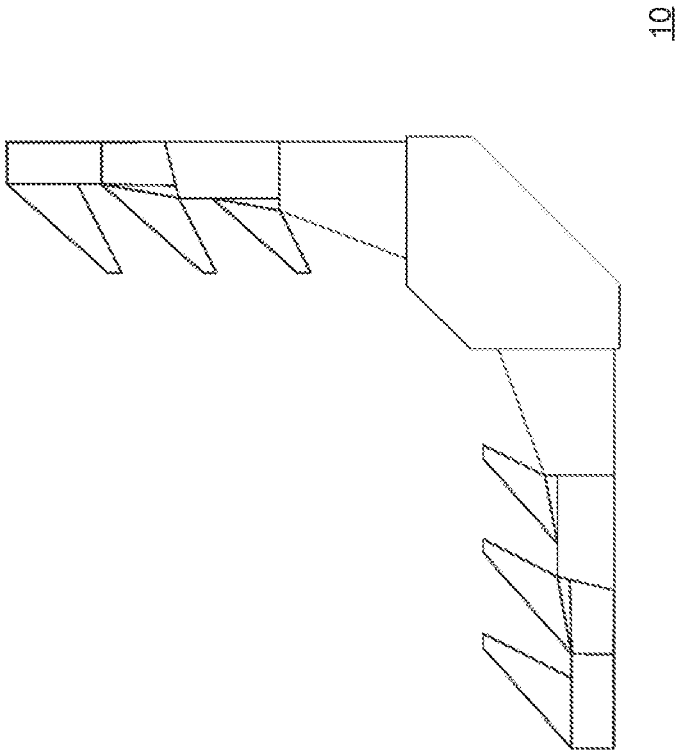
FIG. 1 (CONVENTIONAL ART)
FIG. 1 illustrates an example of a conventional connector of an insulated glass unit (IGU)

The present invention now is described more fully hereinafter with reference to the accompanying drawings, in which embodiments of the invention are shown. This invention, however, may be embodied in many different forms and should not be construed as limited to the embodiments set forth herein; rather, these embodiments are provided so that this disclosure will be thorough and complete, and will fully convey the scope of the invention to those skilled in the art.

Referring now to the drawings, exemplary embodiments of an electrical spacer bar transfer device (E-SBTD) and an electrical spacer bar receiving device (E-SBRD) of an electrical spacer bar transfer device (E-SBTD) system.

FIG. 1 illustrates an example of a conventional connector 10 that is configured to fasten or connect the spacer bar of conventional glass products (GPs). In some products, the connector can be provided at each corner, for example of a window unit, to fasten side edges (e.g., extrusions) of the frame window unit. In some examples, the connector can be formed from plastic or from another material.

The present invention provides an E-SBTD 100 system having an E-SBTD 100 that can be simply and easily incorporated or integrated into EGPs (e.g., various insulated glass (IG), laminated veneer, spandrel, creative glass, textured glass, security glass, etc., among other devices) in a similar manner that the typical connector would be used, while allowing for maximum electricity generation by electricity-generating surface(s) of the electricity-generating glass product (EGP) and effective electron or electricity transfer from such electricity-generating surface(s) of the EGP to the elements of the E-SBTD 100, while at the same time, maintaining integrity, function, purpose, and performance properties (e.g., regarding heat gain and insulating characteristics, and internal atmospheres, aesthetic value, etc.) of the EGP (e.g., insulated glass, laminated veneer, spandrel, etc. or other glass fabricated product). The E-SBTD 100 system further allows for effective electron or electricity transfer from the E-SBTD 100 to an E-SBRD 200 disposed, for example, in a corresponding window frame 500 in which the EGP is mounted.

FIGS. 2A-6B illustrate exemplary embodiments of an E-SBTD 100 and an E-SBRD 200 of an E-SBTD 100 system according to the invention.

Figure 2A:
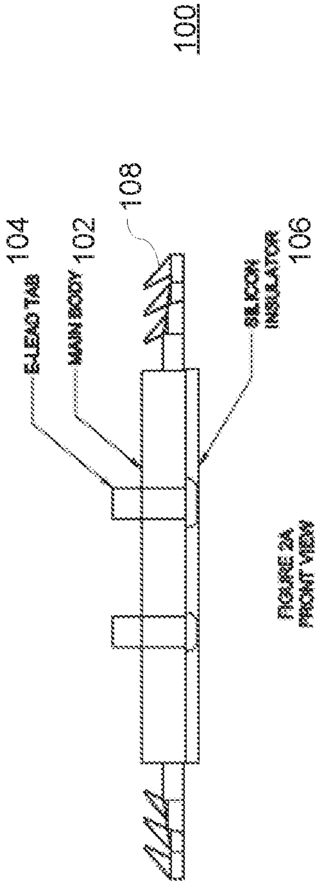
FIGS. 2A-2C illustrate a front, a side, and a bottom view of an E-SBTD according to an exemplary embodiment of the invention.
Figure 2B:
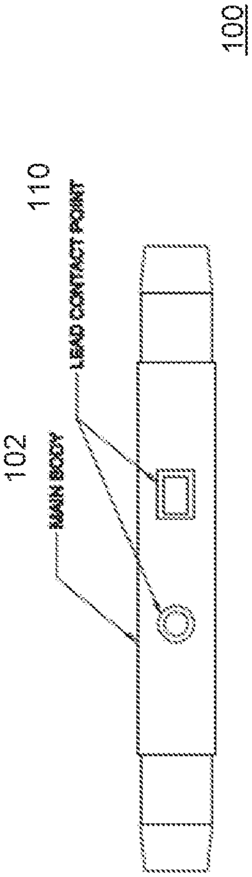
Figure 2C:
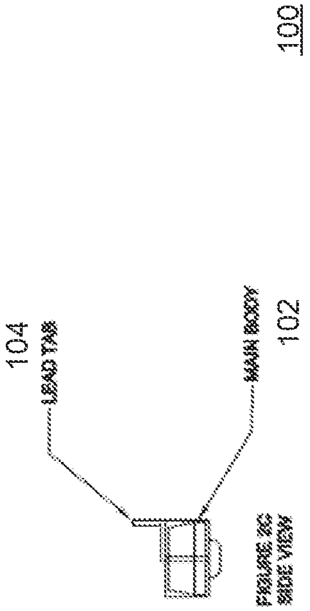

Particularly, FIGS. 2A-2C illustrate a front, side and bottom view of an example of an E-SBTD 100. As shown in the front view (FIG. 2A) of the E-SBTD 100, the E-SBTD 100 has tension bars 206 pointing up and an electron conductor going through the solid body 102 of the device 100. As shown in the front view of FIG. 2A, the E-SBTD 100 can include a non-conductive dielectric insulating material 106 isolating an electrical contact. As shown in the side view (FIG. 2C) of the E-SBTD 100, the electron conductor 104 can be angled for wire/busbar connection. Additionally, the side view (FIG. 2C) also shows details of the non-conductive dielectric insulating material 106 protecting the electrical contact 110. The bottom view (FIG. 2B) of the E-SBTD 100 details an example in which the electrical conductor points 110 of contact are rectangular and circular in design, respectively. This difference in conductor shape can be provided for safety in conductor to conductor alignment. In this example, only similar conductor male and female contacts will work together. This difference can provide advantages of aiding proper alignment and improved safety measures for an installer. The conductor points 110 of contact can be configured to abut, contact, or mate with corresponding electrical contacts on a frame 500 side, allowing for proper electron transfer.

Figures 3A, 3B, 3C:
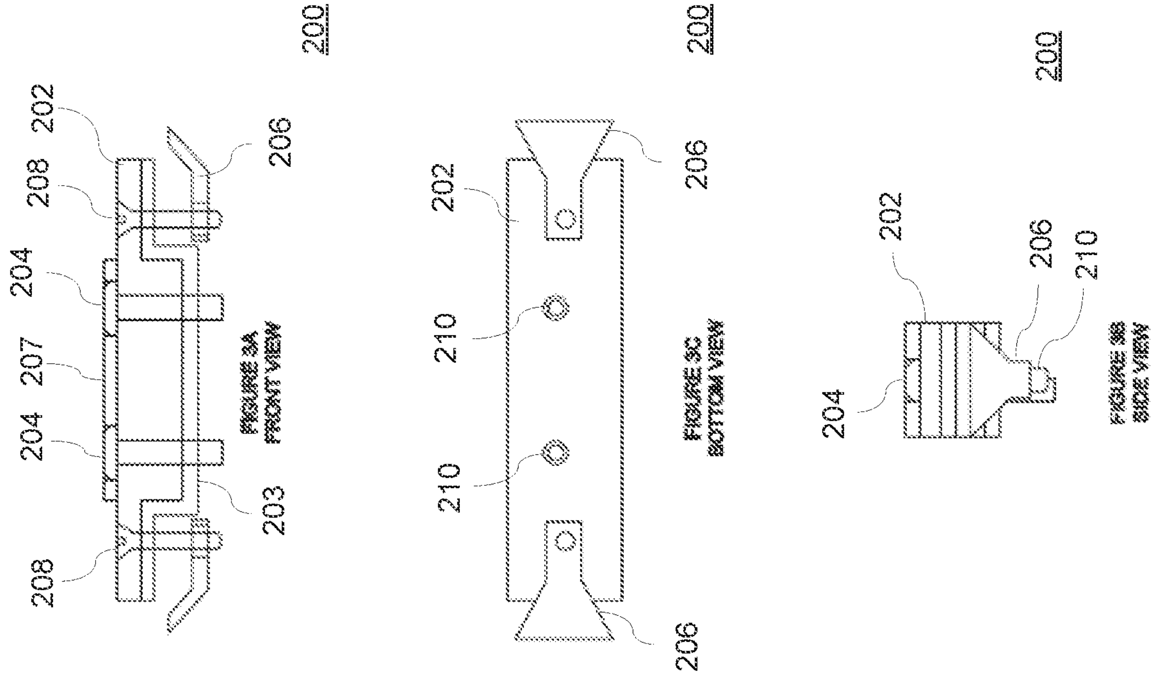
FIGS. 3A-3C illustrate a front, a side, and a bottom view of an E-SBRD according to an exemplary embodiment of the invention.

FIGS. 3A-3C illustrate a front, side, and bottom view of an example of an E-SBRD 200. The front view (FIG. 3A) of the E-SBRD 200 shows an example of an E-SBRD 200 with frame 500 tensioner bars 206 extending upwards. The front view (FIG. 3A) illustrates an example in which the electron conductor 204 going through the solid body 202 of the device 200 is bottom capped by a water tight seal 203, allowing for a safe connection to the corresponding contacts of the E-SBTD 100 when in contact. As shown in the front view of FIG. 3A, the E-SBRD 200 can include a non-conductive dielectric insulating material 207 isolating one or more of the electrical contacts 204. FIGS. 3A-3C illustrate an example of an E-SBRD 200 having a non-conductive dielectric insulating material 207 around the electrical contacts 204 (e.g., surrounding a perimeter of the electrical contacts 204 and extending from the body 202 by a same height, or a greater height, than the contact surfaces of the electrical contacts 204) to provide a water tight and structural seal (e.g., a non-conductive dielectric insulating material 207 such a silicone seal, a rubber seal, or a seal formed by one or more other materials or arrangements) that can aid in reducing electrical contact (e.g., unintentional electrical contact with another electrically conductive material, with a body 202 part of a user/installer, etc.) when the window 400 is not installed in the frame 500. In some examples, the electrical conductor points 204 of contact of the E-SBRD 200 can be rectangular or circular in design, respectively. This difference in conductor shape can provide improved safety for conductor to conductor alignment that promotes electrical continuity. In some examples, only similar conductors 110, 204 (e.g., male and female contacts) of the E-SBTD 100 and of the E-SBRD 200 will work together. This difference can provide advantages of aiding proper alignment and safety measures for an installer. The conductor points 110 of contact of the E-SBTD 100 on the window side can be designed to mate with the electrical contacts 204 of the E-SBRD 200 on the frame 500 side, allowing for proper electron transfer.

Figure 4A:
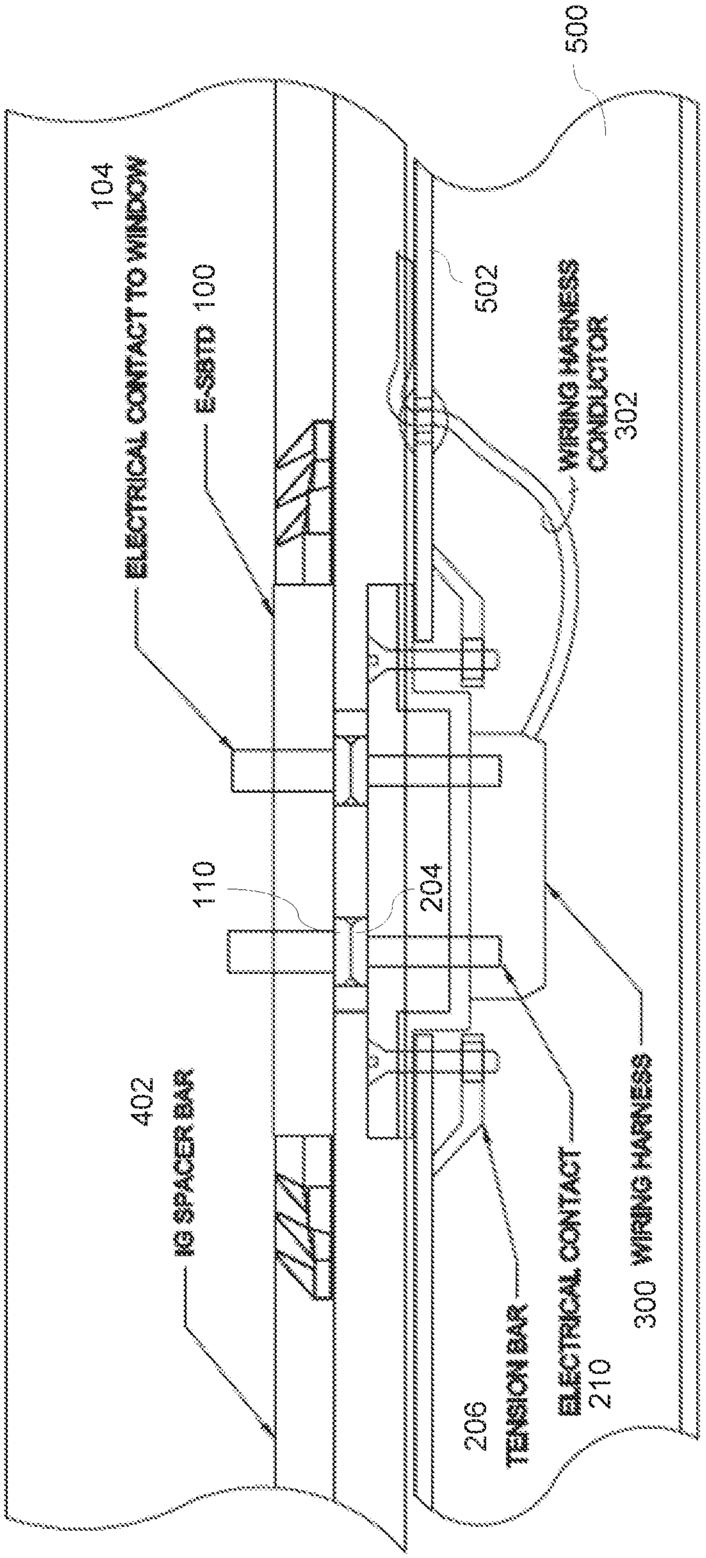
FIG. 4A schematically illustrates a detailed side cutaway view of a system according to an exemplary embodiment of the invention.
Figure 4B:
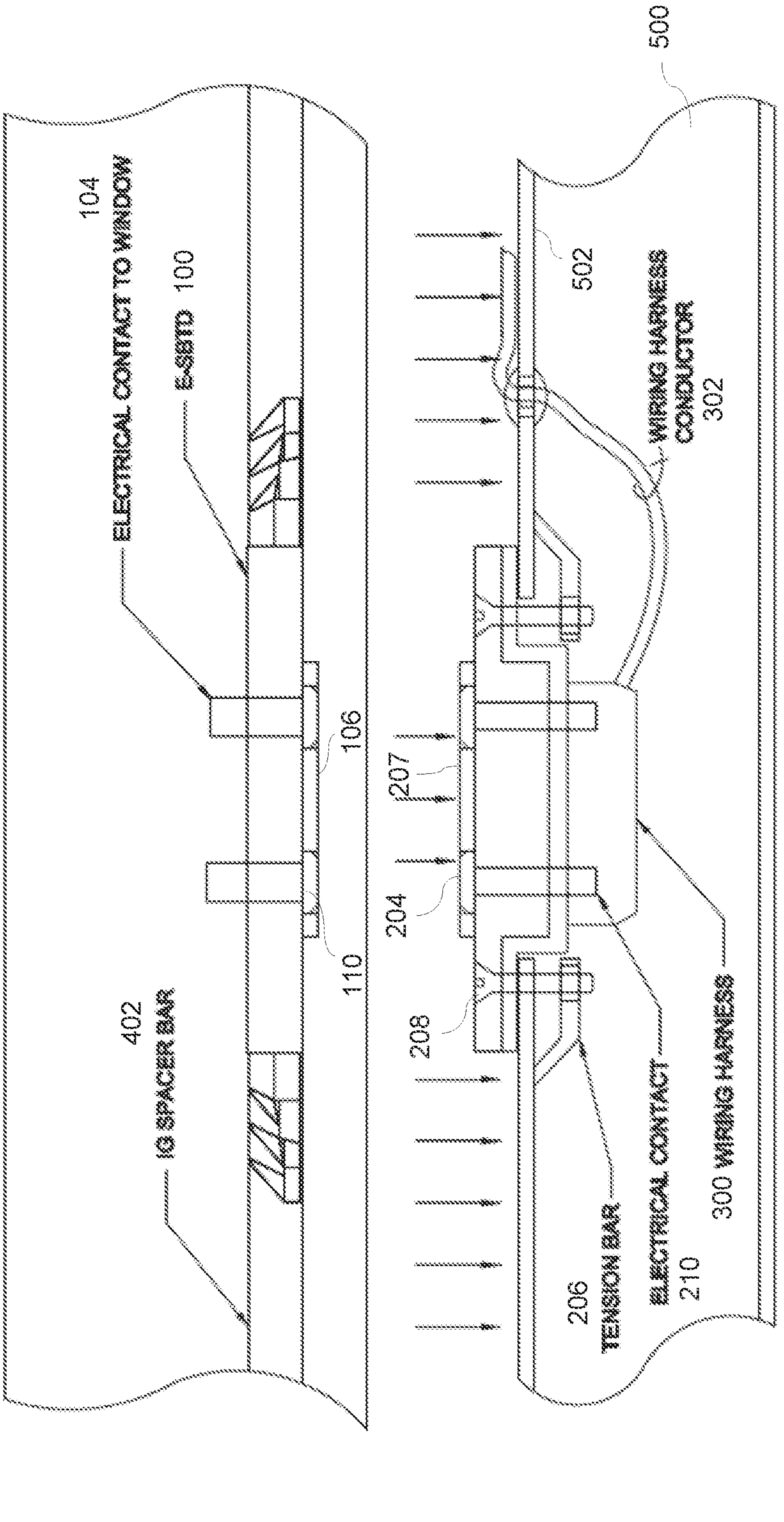
FIG. 4B schematically illustrates an exploded side cutaway view of a system according to the exemplary embodiment of FIG. 4A.

FIGS. 4A and 4B schematically illustrate detailed side cut views of a system according to an exemplary embodiment of the invention. As shown in the example of FIG. 4A, an E-SBTD 100 can be integrated into a sealed edge 402 of a GP or an EGP, such as an insulated window 400. An E-SBRD 200 can be integrated into a frame 500 configured to receive the glass product. As shown in FIG. 4B, when the glass product is installed or mounted in the frame 500, the E-SBTD 100 can be connected to the E-SBRD 200 such that an electrical connection can be provided between the contacts 110 of the E-SBTD 100 and the contacts 204 of the E-SBRD 200. In the example, the electrical connection can be provided by a direct, physical contact between the contacts 110 of the E-SBTD 100 and the contacts 204 of the E-SBRD 200. In other examples, an intervening part can provide an electrical contact or connection between the contacts of the E-SBTD 100 and the contacts of the E-SBRD 200.

As shown in FIGS. 4A and 4B, the E-SBRD 200 can include one or more tension bars 206 configured, for example, to cooperate with one or more screws 208 to secure the E-SBRD 200 to the frame 500. The one or more tension bars 206 can be configured, for example, to be rotatable (e.g., about the screw) such that the tension bars 206 can be rotated into position under a portion of the frame 500 and then drawn, pressed, or tightened, etc. against a surface 502 (e.g., an underside surface) of the frame 500 to couple or secure or fix the portion of the E-SBRD 200 with respect to the frame 500. The E-SBRD 200 can include one or more sealing devices 203, such as a perimeter seal, cup seal, etc., disposed between the body 202 of the E-SBRD 200 and the frame 500 when the E-SBRD 200 is secured to the frame 500 to provide a watertight seal between the E-SBRD 200 and the frame 500, thereby preventing water from passing or infiltrating into the frame 500. For example, in this exemplary embodiment, the seal 203 can be formed by a sealed cup having a perimeter portion that interposes the body 202 of the E-SBRD 200 and the frame 500 to provide a watertight seal (e.g., a hermetic seal), thereby preventing water from entering the frame 500 or contacting the electrical contacts, wiring harness 300, etc. within the frame 500 or below the body 202 of the E-SBRD 200.

In operation, the frame 500 can be provided with an opening, or an opening can be formed in the frame 500, and the E-SBRD 200 can be inserted into the opening of the frame 500 such that the seal 203 is disposed between the body 202 of the E-SBRD 200 and the frame 500. In some examples, the seal 203 can include a cup portion that can be inserted into the opening of the frame 500, which may improve proper alignment and/or sealing of the E-SBRD 200 in the opening (or with respect to the opening) in the frame 500. The one or more tension bars 206 can rotated inward during the insertion of the E-SBRD 200 into the opening and then rotated (e.g., about the screws 208 or another fastening or actuating device) such that the tension bars 206 are positioned under portions of the frame 500 at the perimeter of the opening in the frame 500. The tension bars 206 can then be drawn, pressed, or tightened against a surface 502 (e.g., an underside surface) of the frame 500 by actuated the screws 208 or another fastening or actuating device to couple or secure or fix the portion of the E-SBRD 200 with respect to the frame 500.

FIGS. 4A and 4B show an exemplary arrangement of the corresponding electrical contact points along with an example of silicon insulator coverage. In the illustrated example, the electrical spacer bar transfer device (E-SBTD 100) mates to, is coupled to, or is sealed to the electrical spacer bar receiving device (E-SBRD 200) to provide a watertight and electrically safe connection. Additionally, the distinct shapes and pattern of shapes of the contacts 110, 204 on the E-SBTD 100 and E-SBRD 200, such as rectangle to rectangle and/or circle to circle configurations, can facilitate and allow for proper electrical alignment, proper installation, and electrical continuity.

Figure 5A:
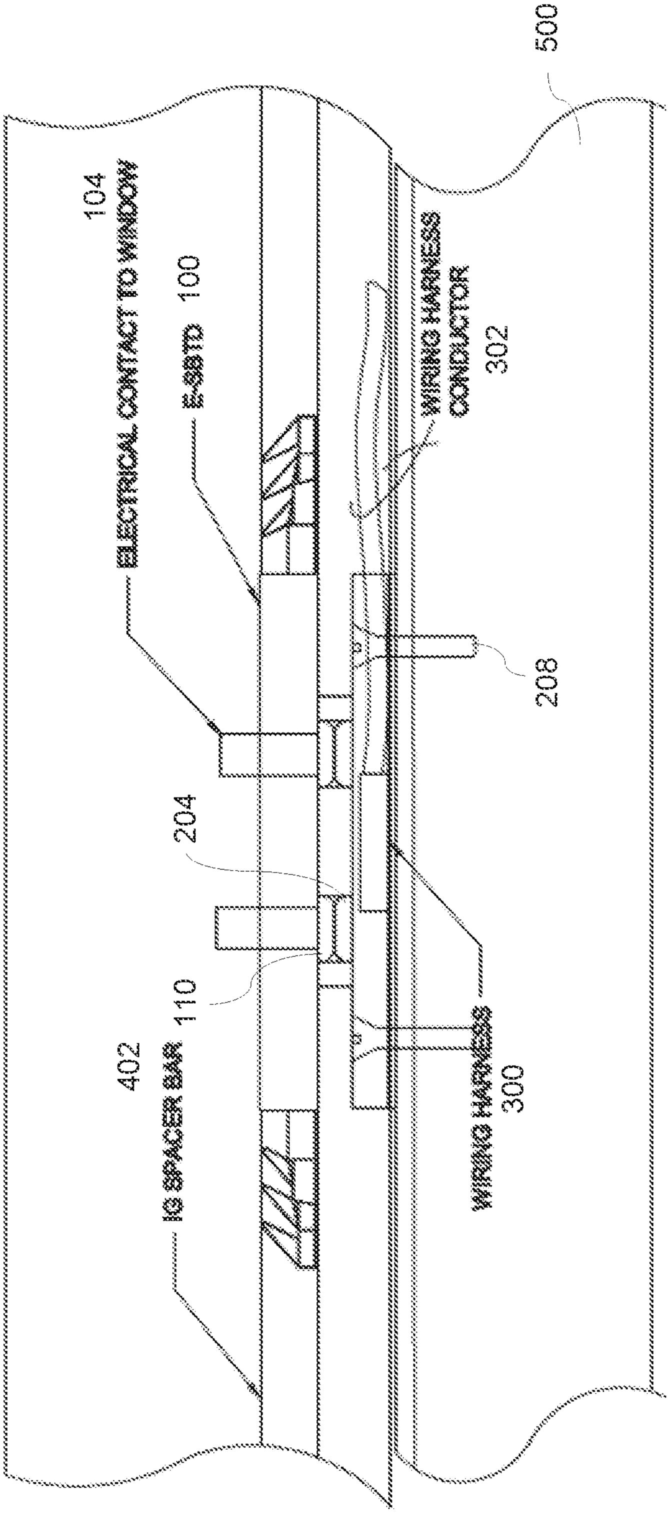
FIG. 5A schematically illustrates a detailed side cutaway view of a system according to an exemplary embodiment of the invention.
Figure 5B:
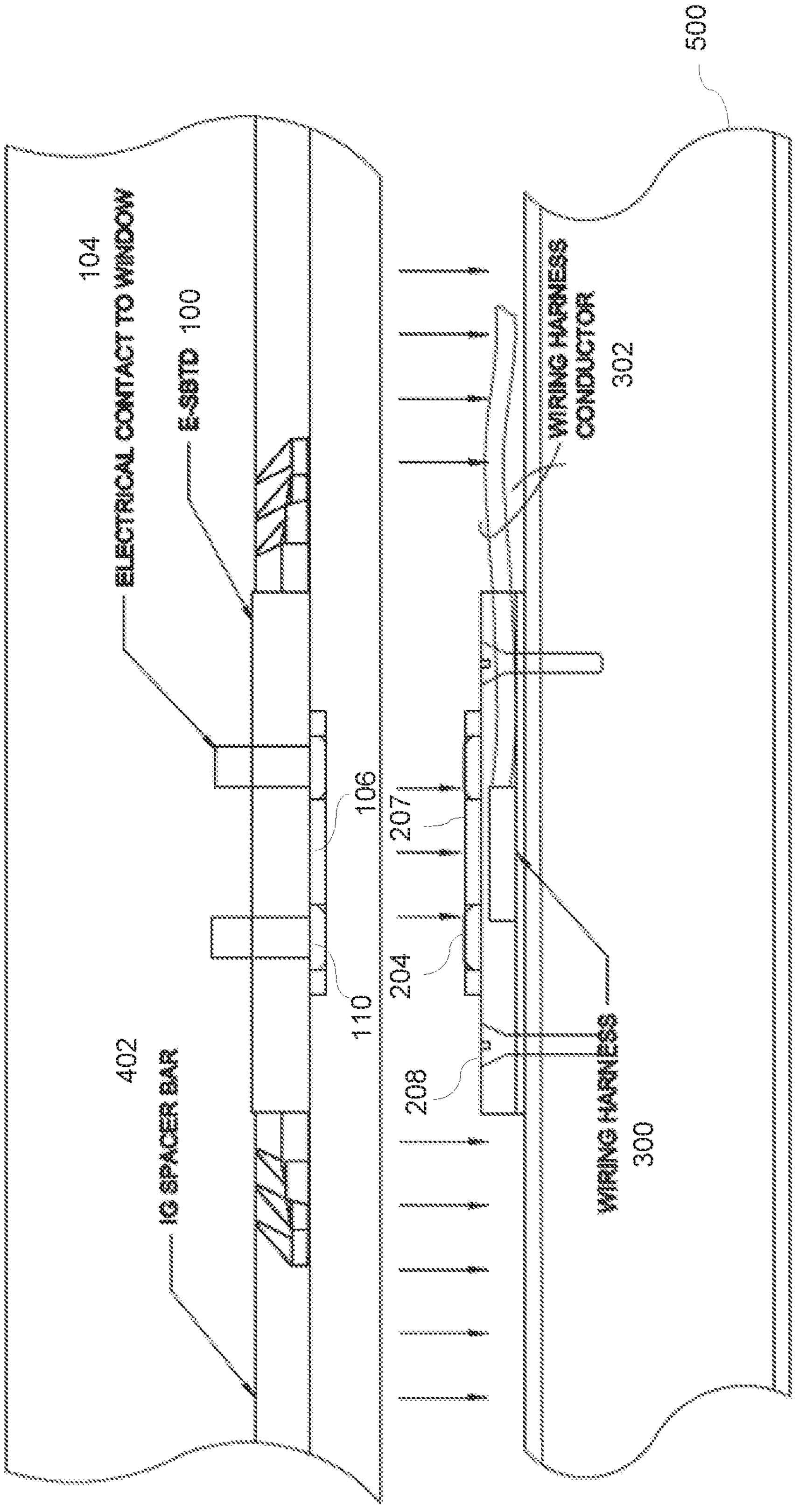
FIG. 5B schematically illustrates an exploded side cutaway view of a system according to the exemplary embodiment of FIG. 5A.

FIGS. 5A and 5B schematically illustrate detailed side cut views of a system according to an exemplary embodiment of the invention. As shown in the example of FIG. 5A, an E-SBTD 100 can be integrated into a sealed edge of a GP or an EGP, such as an insulated window 400. An E-SBRD 200 can be integrated into a frame 500 configured to receive the glass product. As shown in FIG. 5B, when the glass product is installed or mounted in the frame 500, the E-SBTD 100 can be connected to the E-SBRD 200 such that an electrical connection can be provided between the contacts 110 of the E-SBTD 100 and the contacts 204 of the E-SBRD 200. In the example, the electrical connection can be provided by a direct, physical contact between the contacts 110 of the E-SBTD 100 and the contacts 204 of the E-SBRD 200. In other examples, an intervening part can provide an electrical contact or connection between the contacts 110 of the E-SBTD 100 and the contacts 204 of the E-SBRD 200.

As shown in FIGS. 5A and 5B, the E-SBRD 200 can include one or more sealing devices 203, such as a perimeter seal, a seal that extends under the entire E-SBRD 200, etc., disposed between the body 202 of the E-SBRD 200 and the frame 500 when the E-SBRD 200 is secured to the frame 500 to provide a watertight seal between the E-SBRD 200 and the frame 500, thereby preventing water from passing or infiltrating into the frame 500. For example, in this exemplary embodiment, the seal 203 can be formed by a seal 203 having at least a perimeter portion that interposes the body 202 of the E-SBRD 200 and the frame 500 to provide a watertight seal (e.g., a hermetic seal), thereby preventing water from entering the frame 500 or contacting the electrical contacts, wiring harness 300, etc. within the frame 500 or below the body 202 of the E-SBRD 200.

In operation, the frame 500 can be provided without an opening at all, or with only one or more openings for receiving fastening devices, such as screws 208. The E-SBRD 200 can be placed or mounted on the frame 500 such that the seal 203 is disposed between the body 202 of the E-SBRD 200 and the frame 500. One or more fastening devices, such as screws 208, can be inserted through the body 202 of the E-SBRD 200, or openings in the body 202 of the E-SBRD 200, and into the frame 500 to secure the E-SBRD 200 to the frame 500.

FIGS. 5A and 5B show an exemplary arrangement of the corresponding electrical contact points 110, 204 along with an example of silicon insulator coverage 106, 207. In the illustrated example, the electrical spacer bar transfer device (E-SBTD 100) mates to, is coupled to, or is sealed to the electrical spacer bar receiving device (E-SBRD 200) to provide a watertight and electrically safe connection. Additionally, the distinct shapes and pattern of shapes of the contacts 110, 204 on the E-SBTD 100 and E-SBRD 200, such as rectangle to rectangle and/or circle to circle configurations, can facilitate and allow for proper electrical alignment, proper installation, and electrical continuity.

Figure 6A:
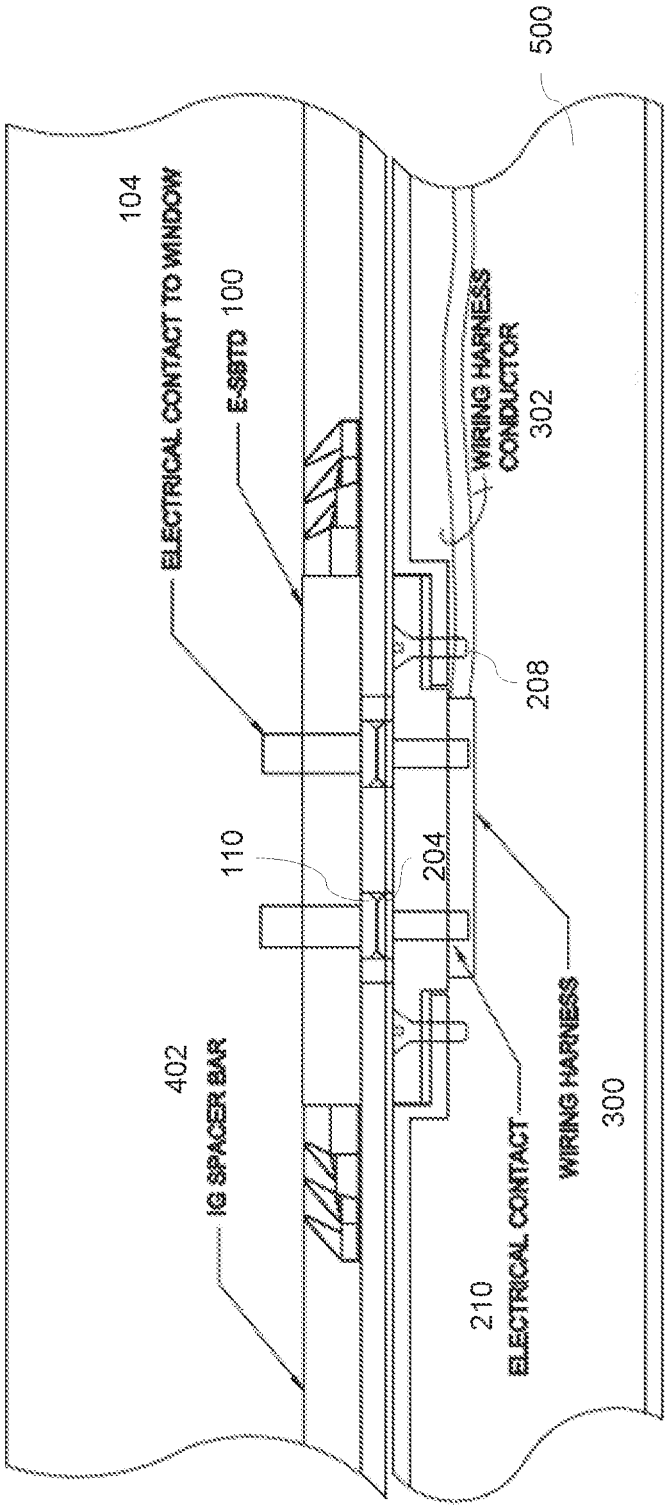
FIG. 6A schematically illustrates a detailed side cutaway view of a system according to an exemplary embodiment of the invention.
Figure 6B:
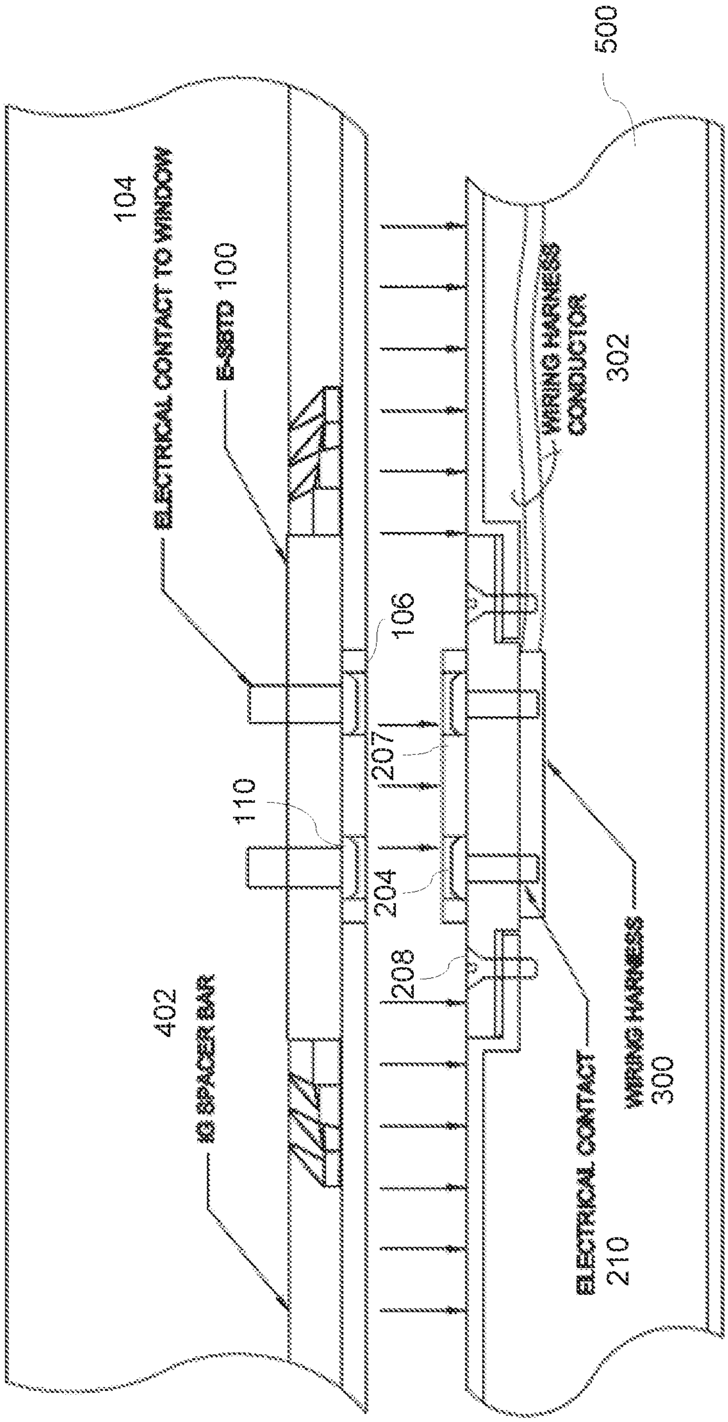
FIG. 6B schematically illustrates an exploded side cutaway view of a system according to the exemplary embodiment of FIG. 6A.

FIGS. 6A and 6B schematically illustrate detailed side cut views of a system according to another exemplary embodiment of the invention. As shown in the example of FIG. 6A, an E-SBTD 100 can be integrated into a sealed edge of a GP or an EGP, such as an insulated window 400. An E-SBRD 200 can be integrated into a frame 500 configured to receive the glass product. As shown in FIG. 6B, when the glass product is installed or mounted in the frame 500, the E-SBTD 100 can be connected to the E-SBRD 200 such that an electrical connection can be provided between the contacts 110 of the E-SBTD 100 and the contacts 204 of the E-SBRD 200. In the example, the electrical connection can be provided by a direct, physical contact between the contacts 110 of the E-SBTD 100 and the contacts 204 of the E-SBRD 200. In other examples, an intervening part can provide an electrical contact or connection between the contacts 110 of the E-SBTD 100 and the contacts 204 of the E-SBRD 200.

As shown in FIGS. 6A and 6B, the E-SBRD 200 can include one or more sealing devices 203, such as a perimeter seal, a seal that extends under the entire E-SBRD 200, etc., disposed between the body 202 of the E-SBRD 200 and the frame 500 when the E-SBRD 200 is secured to the frame 500 to provide a watertight seal between the E-SBRD 200 and the frame 500, thereby preventing water from passing or infiltrating into the frame 500. For example, in this exemplary embodiment, the seal 203 can be formed by a seal having at least a perimeter portion that interposes the body 202 of the E-SBRD 200 and the frame 500 to provide a watertight seal (e.g., a hermetic seal), thereby preventing water from entering the frame 500 or contacting the electrical contacts 110, 204, wiring harness 300, etc. within the frame 500 or below the body 202 of the E-SBRD 200.

In this example, the frame 500 can be provided with an opening, or an opening can be formed in the frame 500. In some examples, the frame 500 can include a countersunk base or support integrally formed on a portion of the frame 500 and configured to receive the E-SBRD 200, such that at least a portion of the E-SBRD 200 sits within the countersunk base or support. One or more openings can be formed in the lower portion of the countersunk base or support. In operation, the E-SBRD 200 can be inserted into the countersunk base or support opening of the frame 500 such that the seal 203 is disposed between the body 202 of the E-SBRD 200 and the frame 500. The seal 203 can be disposed on the frame 500 adjacent to the countersunk base or support and/or within a portion of the countersunk base or support. In some examples, the seal 203 can include a cup portion that can be inserted into at least a portion of the opening of the frame 500 and/or the countersunk base or support, which may improve proper alignment and/or sealing of the E-SBRD 200 in the opening (or with respect to the opening) in the frame 500. One or more screws 208 and/or tension bars 206 can be configured, for example, to couple or secure or fix the portion of the E-SBRD 200 with respect to the frame 500.

In some examples, the countersunk base or support can be provided without an opening at all, or with only one or more openings for receiving fastening devices, such as screws 208. The E-SBRD 200 can be placed or mounted on the countersunk base or support of the frame 500 such that the seal 203 is disposed between the body 202 of the E-SBRD 200 and the frame 500. One or more fastening devices, such as screws 208, can be inserted through the body 202 of the E-SBRD 200, or openings in the body 202 of the E-SBRD 200, and into the frame 500 to secure the E-SBRD 200 to the frame 500.

FIGS. 6A and 6B show an exemplary arrangement of the corresponding electrical contact points 110, 204 along with an example of silicon insulator coverage 106, 207. In the illustrated example, the electrical spacer bar transfer device (E-SBTD 100) mates to, is coupled to, or is sealed to the electrical spacer bar receiving device (E-SBRD 200) to provide a watertight and electrically safe connection. Additionally, the distinct shapes and pattern of shapes of the contacts 110, 204 on the E-SBTD 100 and E-SBRD 200, such as rectangle to rectangle and/or circle to circle configurations, can facilitate and allow for proper electrical alignment, proper installation, and electrical continuity.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A system comprising:

an electrical transfer device configured to be attached to a spacer bar along an edge of an electricity-generating surface, wherein:

the spacer bar spaces apart the electricity-generating surface from a second surface and defines a perimeter of a volume between the electricity-generating surface and the second surface, the electrical transfer device is configured to, when attached to the spacer bar, be physically contiguous with the spacer bar and physically seal off the volume, the electrical transfer device includes:

a plurality of first electrical contacts that are external to the volume, wherein the plurality of first electrical contacts includes:

a first electrical contact having a first shape, and a second electrical contact having a second shape different from the first shape, and a plurality of internal electrical connections that are internal to the volume, the plurality of first electrical contacts are electrically connected, one-to-one, with the plurality of internal electrical connections, and the plurality of internal electrical connections are configured to be connected to electricity-generating components of the electricity-generating surface; and an electrical receiving device configured to be connected to a frame that is configured to receive the spacer bar, wherein:

the electrical receiving device includes a plurality of second electrical contacts that are configured to mate, one-to-one, with the plurality of first electrical contacts of the electrical receiving device when the spacer bar is mounted to the frame to create an electrical connection between the plurality of second electrical contacts and the plurality of first electrical contacts, the plurality of second electrical contacts includes:

a third electrical contact having the first shape, and a fourth electrical contact having the second shape, and the first, second, third, and fourth electrical contacts are configured to permit electrical connection of the plurality of first electrical contacts to the plurality of second electrical contacts in only one way.

2. The system of claim 1, wherein at least one of the electrical transfer device and the electrical receiving device includes a silicone seal configured to seal the plurality of first electrical contacts and the plurality of second electrical contacts from an external environment when the plurality of first electrical contacts are electrically connected with the plurality of second electrical contacts.

3. The system of claim 1, wherein the electrical transfer device includes a dielectric insulating material around the plurality of first electrical contacts.

4. The system of claim 1, wherein the electrical transfer device is configured to be electrically connected to the electrical receiving device using an intervening part between the electrical transfer device and the electrical receiving device.

5. The system of claim 1, wherein at least a portion of a body of the electrical receiving device is configured to be inserted into an opening in the frame.

6. The system of claim 1, further comprising:

at least one sealing device between a body of the electrical receiving device and the frame, wherein the at least one sealing device is configured to provide a watertight seal between the electrical receiving device and the frame.

7. The system of claim 6, wherein at least a portion of the at least one sealing device is configured to be inserted into an opening in the frame.

8. The system of claim 7, wherein the at least one sealing device includes:

a perimeter portion that interposes the body of the electrical receiving device and the frame to provide the watertight seal; and a cup portion configured to be inserted into the opening in the frame.

9. The system of claim 1, further comprising:

the electricity-generating surface attached to one face of the spacer bar; and the second surface attached to an opposite face of the spacer bar, wherein the electrical transfer device is attached to the spacer bar.

10. The system of claim 9, wherein the electricity-generating surface includes one or more of insulated glass, laminated veneer, spandrel, creative glass, textured glass, or security glass.

11. A window comprising:

the system of claim 9; and the frame, wherein the system is installed into the frame.

12. The system of claim 9, wherein the second surface includes one or more of insulated glass, laminated veneer, spandrel, creative glass, textured glass, or security glass.

13. The system of claim 9 wherein the system is an insulated glass unit (IGU).

14. The system of claim 1, wherein at least a portion of a body of the electrical transfer device is configured to be inserted into an opening in the spacer bar.

15. The system of claim 14, wherein:

the spacer bar includes a gap making the perimeter discontinuous, and the electrical transfer device is configured to fill the gap.

16. The system of claim 15, wherein:

the spacer bar includes a first end with a first opening on one side of the gap and a second end with a second opening on an other side of the gap, the electrical transfer device includes a first engagement device configured to be inserted into the first opening, and the electrical transfer device includes a second engagement device configured to be inserted into the second opening.

17. The system of claim 16, wherein:

the first engagement device is a barbed fitting, and the second engagement device is a barbed fitting.

18. The system of claim 15, wherein:

the spacer bar includes four pieces connected at right angles to form a rectangle that is complete except for the gap, and two of the four pieces are collinear and separated from each other to create the gap.

19. The system of claim 1, wherein:

the frame includes a countersunk support portion, and at least a portion of a body of the electrical receiving device is configured to be disposed within the countersunk support portion.

20. The system of claim 1, wherein:

the first shape is a radial shape, and the second shape is a square shape.

* * * * *